United States Patent
Aoki et al.

(10) Patent No.: US 9,421,828 B2
(45) Date of Patent: Aug. 23, 2016

(54) PNEUMATIC TIRE FOR MOTORCYCLE

(71) Applicant: BRIDGESTONE CORPORATION, Chuo-ku, Tokyo (JP)

(72) Inventors: Shinji Aoki, Kodaira (JP); Daisuke Kurashina, Nagano (JP)

(73) Assignee: BRIDGESTONE CORPORATION, Tokyo (JP)

( * ) Notice: Subject to any disclaimer, the term of this patent is extended or adjusted under 35 U.S.C. 154(b) by 190 days.

(21) Appl. No.: 14/362,327

(22) PCT Filed: Nov. 22, 2012

(86) PCT No.: PCT/JP2012/007535
§ 371 (c)(1),
(2) Date: Jun. 2, 2014

(87) PCT Pub. No.: WO2013/084436
PCT Pub. Date: Jun. 13, 2013

(65) Prior Publication Data
US 2014/0311639 A1 Oct. 23, 2014

(30) Foreign Application Priority Data
Dec. 6, 2011 (JP) .................... 2011-267003

(51) Int. Cl.
*B60C 11/03* (2006.01)

(52) U.S. Cl.
CPC ........... *B60C 11/0302* (2013.04); *B60C 11/032* (2013.04); *B60C 11/0304* (2013.04); *B60C 2011/0381* (2013.04); *B60C 2011/0383* (2013.04); *B60C 2200/10* (2013.04)

(58) Field of Classification Search
CPC .. B60C 11/03; B60C 11/0302; B60C 11/032; B60C 2011/0339; B60C 2011/0341; B60C 2011/0344; B60C 2011/0353; B60C 2011/0358; B60C 2011/0365; B60C 2011/0372; B60C 2011/0374; B60C 2011/0376; B60C 2011/0381; B60C 2011/0383; B60C 2200/10
USPC .................................. 152/209.11; D12/535
See application file for complete search history.

(56) References Cited

U.S. PATENT DOCUMENTS

| | | | | |
|---|---|---|---|---|
| D502,681 S | * | 3/2005 | Miyasaka | D12/535 |
| D630,160 S | * | 1/2011 | Board | D12/535 |
| D635,504 S | * | 4/2011 | Nakamura | D12/535 |
| D637,139 S | * | 5/2011 | Nakamura | D12/535 |
| D639,232 S | * | 6/2011 | Sugimoto | D12/535 |

FOREIGN PATENT DOCUMENTS

| | | |
|---|---|---|
| JP | 62-118704 U | 7/1987 |
| JP | 08-188016 A | 7/1996 |
| JP | 10264611 A | 10/1998 |
| JP | 1312918 S | 10/2007 |
| JP | 2007-331596 A | 12/2007 |
| JP | 2011-189805 A | 9/2011 |
| JP | 2011-189809 A | 9/2011 |

OTHER PUBLICATIONS

International Search Report, PCT/JP2012/007535, dated Jan. 8, 2013.
Communication dated Jul. 7, 2015 from the Japanese Patent Office in counterpart application No. 2011-267003.
Communication dated Oct. 26, 2015 from the State Intellectual Property Office of the People's Republic of China in counterpart application No. 201280060017.5.
Communication dated Jul. 21, 2015 from the European Patent Office in counterpart application No. 12855721.2.

* cited by examiner

*Primary Examiner* — Eric Hug
(74) *Attorney, Agent, or Firm* — Sughrue Mion, PLLC (57) ABSTRACT

The present invention provides a pneumatic tire for a motorcycle, comprising: a main groove constituted of a first groove and a second groove and having a bent configuration; and an auxiliary groove provided to be distanced in the tread circumferential direction from the main groove, wherein groove widths of the main groove and the auxiliary groove satisfy specific relationship formulae.

2 Claims, 4 Drawing Sheets

PNEUMATIC TIRE FOR MOTORCYCLE

CROSS REFERENCE TO RELATED APPLICATIONS

This application is a National Stage of International Application No. PCT/JP2012/007535 filed Nov. 22, 2012, claiming priority based on Japanese Patent Application No. 2011-267003 filed Dec. 6, 2011, the contents of all of which are incorporated herein by reference in their entirety.

TECHNICAL FIELD

The present invention relates to a pneumatic tire for a motorcycle and, in particular, a pneumatic tire for a motorcycle, capable of achieving good gripping performance on a dry road surface and good gripping performance on a wet road surface in a compatible manner and exhibiting improved wear resistance.

BACKGROUND ART

There has been conventionally known a pneumatic tire for a motorcycle, having in a tread portion thereof a pattern including a number of slant grooves disposed so as to ensure good stability and controllability on a dry road surface and a wet road surface, respectively, in running on a local road (for example, PTL 1).

There has been, recently in particular, a growing demand for applying a pneumatic tire for a motorcycle for running on a local road in general to running on a circuit, as well. However, when such a particular type of conventional pneumatic tire for a motorcycle for running on a local road as described above is applied to running on a circuit, the tire cannot exhibit sufficiently high gripping force required in "sporty" running on a circuit or the like and thus the tire needs to be improved in terms of gripping performance thereof.

Accordingly, there has been a demand in particular for a pneumatic tire for a motorcycle, in which braking force in straight running and lateral force in a cornering situation are enhanced by increasing gripping force of a front tire as a steering wheel.

Figure 1:
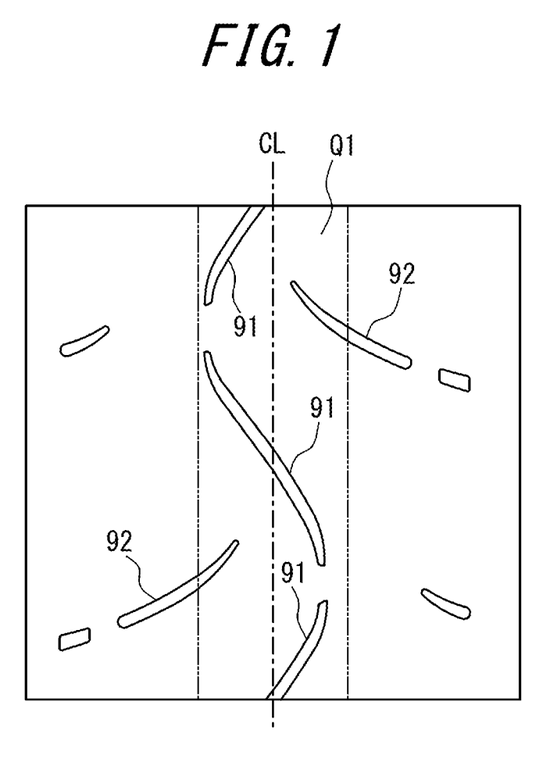
FIG. 1 is a developed view showing a tread of a conventional tire.

In this connection, there has been proposed, as a pneumatic tire for a motorcycle exclusively for circuit running, a pneumatic tire for a motorcycle having a pattern as shown in FIG. 1 (for example, PTL2).

In a pattern shown in FIG. 1, provided that a region constituting a ground contact surface of a tire when the tire, assembled with a prescribed rim and inflated at a prescribed internal pressure, runs straight under prescribed load is referred to as a "ground contact region in straight running" of a tread, a number of first slant grooves 91 and a number of second slant grooves 92 are formed in the tire circumferential direction at intervals therebetween, respectively, such that the first slant grooves 91 are each disposed to be inclined across the tire equatorial plane CL within a ground contact region Q1 in straight running of the tread and the second slant grooves 92 are disposed so as to correspond to the respective first slant grooves 91 and not cross the tire equatorial plane CL.

The first slant grooves 91 and the second slant grooves 92 corresponding thereto are provided such that the first slant grooves 91 and the second slant grooves 92 are separated from each other and inclined in the mutually opposite directions with respect to the tire equatorial plane CL.

An area ratio of the groove portions with respect to the total tread portion (a negative ratio) is suppressed to a very low value in this tread pattern in order to improve gripping performance on a dry road surface as required in circuit running.

The tread pattern, thus having a relatively small area of groove portions, can possibly suppress wear in a shoulder portion in particular of the tire, as well.

CITATION LIST

Patent Literature

PTL 1: JP2007-331596
PTL2: Japanese registered design 1312918

SUMMARY OF THE INVENTION

Technical Problems

However, the tire described in PTL2, having a relatively small negative ratio, causes a problem in that the tire fails to show satisfactory gripping performance in a wet condition due to poor drainage performance. Further, the tire described in PTL2 causes another problem in that the small negative ratio thereof increases out-of-plane bending rigidity of the tire, which decreases a ground contact area in a cornering situation to disturb improvement of gripping performance of the tire.

In this regard, if the negative ratio of the tire is increased in order to improve drainage performance thereof, wear in a shoulder portion in particular is likely to be facilitated due to a decrease in rigidity of land portions. In short, gripping performance on a dry surface and wear resistance are in a trade-off relationship with gripping performance in a wet condition and/or a cornering situation.

The present invention has been contrived to solve the problems described above and an object thereof is to provide a pneumatic tire for a motorcycle, capable of achieving good gripping performance on a dry road surface and good gripping performance on a wet road surface in a compatible manner and exhibiting improved wear resistance.

Solution to the Problems

The inventors of the present invention made a keen study to solve the aforementioned problems.

As a result, the inventors of the present invention newly discovered that it is possible to improve wear resistance, gripping performance on a dry road surface, and gripping performance on a wet road surface in a compatible manner by forming main grooves and auxiliary grooves (each auxiliary groove is provided in the vicinity of an end portion in the tire rotation direction of the corresponding main groove so as to be distanced therefrom in the tire rotation direction) in appropriate positions and configurations, respectively, and setting groove widths of these grooves to satisfy appropriate relationship formulae.

Main structural features of the pneumatic tire of the present invention are as follows.

(1) A pneumatic tire for a motorcycle, having a pair of bead portions, a pair of sidewall portions continuous with the bead portions, a tread provided to extend in a toroidal shape across the pair of sidewall portions, and a directional pattern provided at the tread specifying a rotation direction when the tire is mounted on a vehicle; comprising: a main groove in a bent shape, constituted of a first groove extending in a tread circumferential direction within a ground contact region in straight running, of a ground contact surface of the tread, and a second groove extending from an end portion, on the side of the rotation direction specified by the directional pattern, of the first groove toward the outer side in a tread width direction with slantly approaching the specified rotation direction; and an auxiliary groove formed at a position on the outer side in the tread width direction of the second groove and distanced in the tread circumferential direction from an end portion, on the side of the rotation direction specified by the directional pattern, of the second groove such that the auxiliary groove extends toward the outer side in the tread width direction with slantly approaching the specified rotation direction, wherein, provided that a groove width of the main groove at a connection portion of the first groove and the second groove is A (mm), a groove width of the second groove at an end on the outer side in the tread width direction is B (mm), and a groove width of the auxiliary groove is C (mm), A>B≥C.

(2) The pneumatic tire for a motorcycle of (1) above, wherein, provided that an inclination angle of the second groove with respect to the tread circumferential direction is θ1 and an inclination angle of the auxiliary groove with respect to the tread circumferential direction is θ2, θ21 θ2.

(3) The pneumatic tire for a motorcycle of (1) or (2) above, wherein, provided that a distance in the tread width direction between the tire equatorial plane and a bending point on the outer side in the tread width direction of two bending points connecting the first groove and the second groove in the bent shape is d (mm); and a tread width is TW (mm), 0.25≤d/TW≤0.45.

Advantageous Effect of the Invention

According to the present invention, it is possible to provide a pneumatic tire for a motorcycle, capable of achieving gripping performance on a dry road surface and gripping performance on a wet road surface in a highly compatible manner and exhibiting good wear resistance, as well, by forming in a tread of the tire main grooves and auxiliary grooves in appropriate positions and configurations, respectively, and setting groove widths of these grooves to satisfy appropriate relationship formulae.

DESCRIPTION OF THE EMBODIMENTS

The present invention will be described in detail with reference to the drawings hereinafter.

Figure 2:
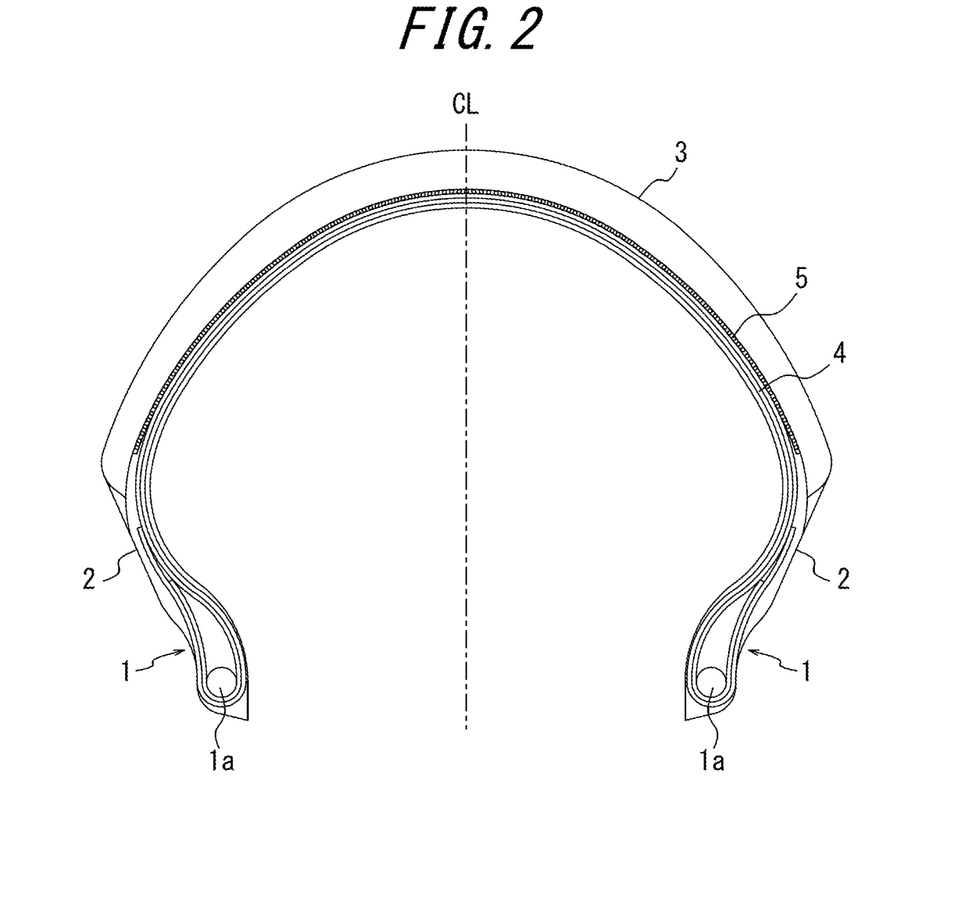
FIG. 2 is a cross sectional view showing a pneumatic tire for a motorcycle according to one embodiment of the present invention.

FIG. 2 is a cross sectional view showing a pneumatic tire for a motorcycle (which tire will be referred to simply as a "tire" hereinafter) according to one embodiment of the present invention.

The tire of the present embodiment has, as in the conventional tire structure, a pair of bead portions 1, a pair of sidewall portions 2 continuous with the bead portions 1, and a tread 3 provided to extend in a toroidal shape across the pair of sidewall portions 2, as shown in FIG. 2.

Each of the bead portions 1 has a bead core 1a, and a carcass 4 extends in a toroidal shpe across these bead cores 1a. A belt 5 is provided on the outer side in the tire radial direction of the carcass 4.

Figure 3A:
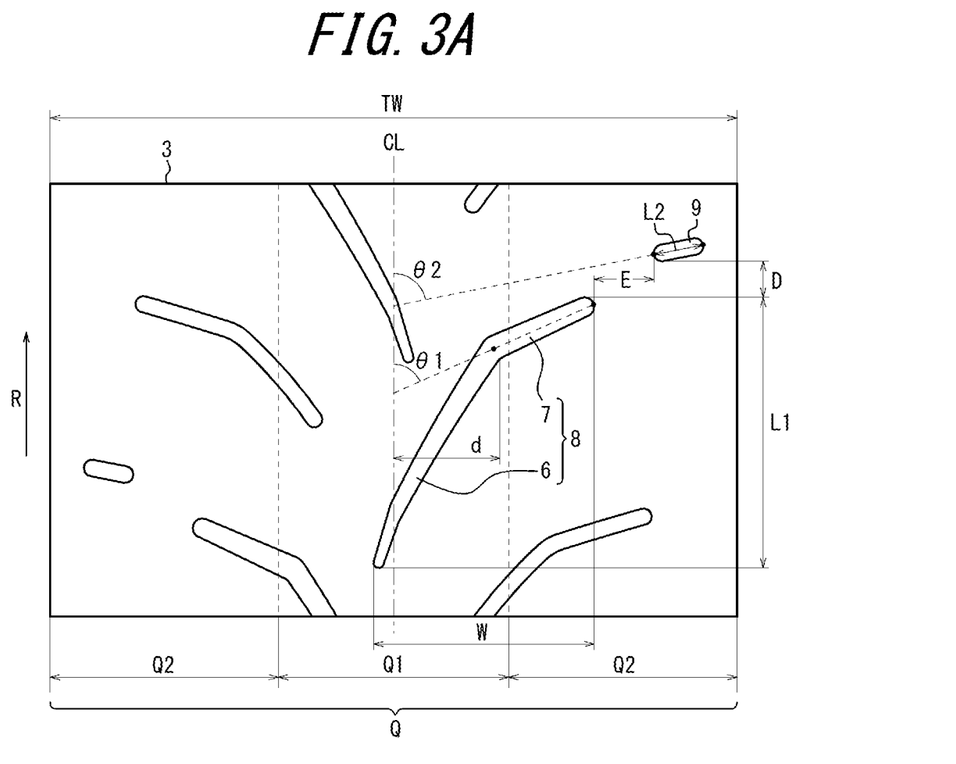
FIG. 3A is a developed view of a tread of the pneumatic tire for a motorcycle according to the one embodiment of the present invention.

FIG. 3A is a view showing a ground contact region Q of the tread 3 of the tire according to the one embodiment of the present invention.

The ground contact region Q of the tread 3 is divided into a ground contact region Q1 in straight running of a vehicle and outer ground contact regions Q2 each on the outer side in the tread width direction of the ground contact region Q1. A "ground contact region in straight running" represents a region constituting a ground contact surface of a tire when the tire, assembled with a prescribed rim and inflated at prescribed internal pressure, is made to run straight under prescribed load.

A "prescribed rim" represents a rim prescribed for each tire by an industrial standard which is valid in an area where the tire is manufactured and used. Examples of a prescribed rim include: a standard rim prescribed by YEAR BOOK of JATMA (The Japan Automobile Tyre Manufacturers Association, Inc.) in Japan; "Design Rim" prescribed by YEAR BOOK of TRA (THE TIRE and RIM ASSOCIATION INC.) in the United. States; and "Measuring Rim" prescribed by STANDARD MANUAL of ETRTO (European Tyre and Rim Technical Organisation) in Europe. "Prescribed load" represents load corresponding to the maximum load on a tire prescribed according to the size of the tire by the aforementioned industrial standards such as JATMA. A "prescribed internal pressure" represents an air pressure corresponding to the aforementioned prescribed load, i.e. the maximum air pressure.

The tire of the present embodiment has in the tread 3: a first groove 6 extending in a tread circumferential direction within a ground contact region Q1 in straight running; and a second groove 7 extending in an outer ground contact region Q2 from an end portion, on the side of a rotation direction specified by a directional tread pattern (a direction specified to be the rotation direction of the tire when the tire is mounted on a vehicle, i.e. the direction indicated by an arrow R in FIG. 3A), of the first groove 6 toward the outer side in a tread width direction with slantly approaching the specified rotation direction.

The first groove 6 and the second groove 7 are connected to each other to form a main groove 8.

Further, the tire of the present embodiment exemplarily shown in FIG. 3A has an auxiliary groove 9 formed at a position on the outer side in the tread width direction of the second groove 7 and distanced in the specified rotation direction from an end portion, on the side of the specified rotation direction, of the second groove 7 such that the auxiliary groove 9 extends toward the outer side in the tread width direction with slantly approaching the specified rotation direction.

In the example shown in FIG. 3A, the main grooves 8 form a pattern in which the main grooves 8 are disposed in one half surface side and the other half surface side of the tread alternately with respect to the tire equatorial plane CL at intervals therebetween in the tire circumferential direction. A similar disposition pattern is applied to the auxiliary grooves 9, as well.

In the present invention, an expression that a "first groove extends within a ground contact region in straight running" represents that at least 70% of groove area of the first groove 6 resides within the ground contact region Q1 in straight running. Accordingly, it is acceptable that a part of the first groove 6 is disposed in an outer ground contact region Q2 and/or a part of the first groove 6 trespasses on the other half portion of the tread beyond the tire equatorial plane CL as shown in FIG. 3A. Further, an expression that a "second groove extends in an outer ground contact region" represents that at least 50% of groove area of the second groove 7 resides within the outer ground contact region Q2.

Accordingly, it is acceptable that a part of the second groove 7 is disposed to trespass on the adjacent ground contact region Q1, as shown in FIG. 3A.

Yet further, provided that a groove width of the main groove at a connection portion of the first groove 6 and the second groove 7 is A (mm), a groove width of the second groove 7 at an end on the outer side in the tread width direction (thereof) is B (mm), and a groove width of the auxiliary groove 9 is C (mm), the groove widths A, B and C of the tire of the present invention satisfy a formula A>B≥C.

Figure 3B:
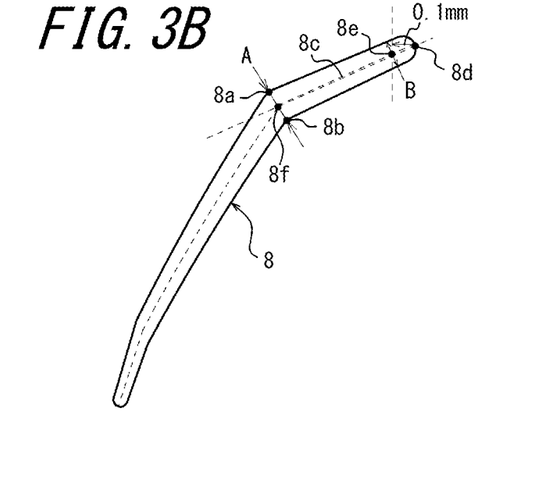
FIG. 3B is a view for explaining groove widths of a main groove.

In the present invention, "a groove width A of the main groove at a connection portion thereof" represents a length of a line linking two bending points 8a, 8b of the main grooves when the first groove and the second groove are connected to each other in a bent shape at these two bending points 8a, 8b, as shown in FIG. 3B. Further, "a groove width B of the second groove at an end on the outer side in the tread width direction thereof" represents, provided that a point 8e is set on the groove centerline (a line plotted by linking the middle points of groove widths) 8c such that the point 8e is shifted by 0.1 mm on the inner side in the tread width direction from the terminal point 8d on the outer side in the tread width direction of the centerline 8c, a groove width having the point 8e as the groove-width middle point thereof, of the main groove 8.

Figure 3C:
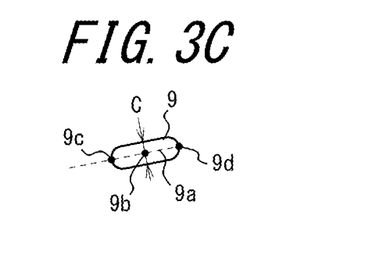
FIG. 3C is a view for explaining a groove width of an auxiliary groove.

Yet further, "a groove width C of the auxiliary groove" represents, provided that point 9b is set on the groove center line 9a of the auxiliary groove 9 to be at the center in the tread width direction thereof, a groove width having the point 9b as the groove-width middle point thereof, of the auxiliary groove 9.

It is necessary to maintain required tensile rigidity of the tread against an input of force (external force) from a road surface and suppress deformation of land portions by the external force, to ensure a satisfactorily large ground contact area, in order to reliably achieve good gripping performance on a dry road surface and good wear resistance as the object of the present invention.

On the other hand, it is necessary to improve drainage properties in the ground contact surface Q by grooves in order to improve gripping performance on a wet road surface. In order to improve these performances in a trading-off relationship in a compatible manner, the grooves in the tread must be disposed in a direction of the external force. i) The land portions most effectively avoid being deformed and tensile rigidity against external force is well maintained; ii) slips of the land portions occurring in the direction of the external force move relative to water in the grooves, thereby improving drainage properties; and iii) wear resistance of the tire also improves due to high rigidity of the land portions thus ensured, by providing the grooves in the direction of the external force.

The first groove 6 is provided in a tread circumferential direction, i.e. in a direction along braking force in straight running, in the ground contact region Q1 in straight running in the tire of the present invention.

As a result, deformation of the land portions by external force is suppressed and a satisfactorily large ground contact area is ensured in the ground contact region Q1 in straight running of a vehicle, whereby gripping force on a dry road surface enhances and wear resistance in the ground contact region Q1 in straight running improve. Further, drainage properties in the ground contact region Q1 in straight running also improve, as described above.

The second groove 7 extends from an end portion, on the side of the specified rotation direction, of the first groove 6 toward the outer side in a tread width direction with slantly approaching the specified rotation direction. Specifically, the second groove 7 is provided in a ground contact surface at a cornering situation of a vehicle to extend along an input direction of force at a cornering situation.

As a result, deformation of the land portions by external force is suppressed and a satisfactorily large ground contact area is ensured in the outer ground contact region Q2 at a cornering situation of a vehicle, whereby gripping force on a dry road surface enhances and wear resistance in the outer ground contact region Q2 improves. Further, drainage properties in the outer ground contact region Q2 also improve, as described above.

Yet further, in the tire of the present invention, the second groove 7 is connected to the end portion on the side of the specified rotation direction of the first groove 6 and thus continuous with the first groove 6 to function as a continuous drainage path, thereby improving drainage properties of the tread, i.e. gripping performance on a wet road surface, of the tire.

Yet further, the auxiliary groove 9 extends toward the outer side in the tread width direction with slantly approaching the specified rotation direction, i.e. in a direction along an input direction of force at a cornering situation, thereby contributing to improving gripping force and drainage properties at a cornering situation for the same reasons as described in connection with the second groove.

The auxiliary grooves 9 also successfully improve wear resistance in particular in the vicinities of a shoulder portion where the auxiliary grooves are located, because the auxiliary grooves 9 provided as described above can ensure satisfactorily high rigidity of the land portions.

In the tire of the present invention, it is critically important to form the auxiliary groove 9 at a position on the outer side in the tread width direction of the second groove 7 and distanced in the tread circumferential direction from an end portion on the side of the specified rotation direction of the second groove 7.

Deformability of the land portion blocks in accordance with a camber angle to ensure a satisfactorily large ground contact area, i.e. decreased out-of-plane bending rigidity of the blocks, is advantageous at a cornering situation of a vehicle. In this connection, the tire of the present embodiment, in which the auxiliary groove 9 is provided at a position on the outer side in the tread width direction of the second groove 7 to be distanced in the tread circumferential direction from an end portion on the side of the specified rotation direction of the second groove 7, has the total length of the main groove 8 and the auxiliary groove 9 extending in a force-inputted direction at a cornering situation shorter than the corresponding total length of the main groove 8 and the auxiliary groove 9 in the case where these two grooves are connected with each other. As a result, the tire of the present embodiment can decrease rigidity against the inputted force (the out-of-plane bending rigidity) and increase a ground contact area, thereby successfully improving gripping performance on a dry road surface at a cornering situation.

Further, provided that the groove widths A, B and C are defined as described above, it is critically important that the groove widths A, B and C of the tire of the present invention satisfy the relationship formula: A>B≥C.

A vehicle body of a motorcycle leans to one side and a corresponding outer part, on the width direction, of a tread is gradually brought into contact with the ground when the motorcycle performs a turning. The more the vehicle body leans, the smaller turning radius is resulted, which requires the larger force to meet or support centrifugal force occurring at such a cornering situation.

In this connection, the groove widths A, B, C, satisfying the aforementioned relationship formulae and thus decreasing toward the outer side in the tread width direction, contribute to enhancing rigidities of the land portions toward the outer side in the tread width direction and successfully generating high gripping force on a dry road surface at a cornering situation.

Further, the grooves are provided at a ground contact surface of the tread preferably so that the grooves have configurations in which angles formed by the grooves with respect to the tread circumferential direction gradually increase toward the outer side in the tread width direction, respectively, as shown in FIG. 3A.

In the case of a motorcycle, change in a running state thereof results in change in the position of a ground contact surface in a tread and thus change in performances required thereof. For example, the larger camber angle shifts a ground contact surface on the more external side in the tread width direction. It is advantageous in this regard to form the grooves so that the configurations thereof are the more directed to the tread width direction on the more external side in the tread width direction because then gripping performance on a dry road surface and wear resistance can be reliably improved when the camber angle increases.

Specifically, provided that an inclination angle of the second groove with respect to the tread circumferential direction is θ1 and an inclination angle of the auxiliary groove with respect to the tread circumferential direction is θ2, it is preferable that θ1 and θ2 satisfy θ1<θ2.

In the present invention, an "inclination angle of the second groove with respect to the tread circumferential direction" represents, provided that the second groove has respective terminal points 8d, 8f in the tread width direction, on the groove centerline thereof, an acute angle formed by a line linking the respective terminal points 8d, 8f with respect to the tread circumferential direction.

Further, an "inclination angle of the auxiliary groove with respect to the tread circumferential direction" represents, provided that the auxiliary groove has respective terminal points 9c, 9d in the tread width direction, on the groove centerline thereof, an acute angle formed by a line linking the respective terminal points 9c, 9d with respect to the tread circumferential direction.

In the tire of the present invention, provided that a distance in the tread width direction between the tire equatorial plane CL and the bending point 8b on the outer side in the tread width direction of the two bending points 8a, 8b connecting the first groove 6 and the second groove 7 in a bent shape is d (mm); and a tread width is TW (mm), d and TW preferably satisfy 0.25≤d/TW≤0.45.

Setting the ratio d/TW to be 0.25 ensures a satisfactorily large ground contact area in the ground contact region Q1 in straight running, i.e. good stability in high speed running. Further, setting the ratio d/TW to be 0.45 ensures sufficiently high rigidity in each of the outer ground contact regions Q2, i.e. good cornering properties in each of the outer ground contact regions Q2.

In short, it is possible to improve stability in straight running at high speed and cornering performance at a cornering situation by setting the ratio d/TW to be within the aforementioned range.

With regard to the aforementioned relationship formula: A>B≥C, it is preferable to specifically set the groove width A to be in the range of 6 mm to 9 mm, the groove width B to be in the range of 4 mm to 7 mm, and the groove width C to be in the range of 4 mm to 6 mm.

Further, it is preferable to set the longitudinal length L1 (mm) in the tread circumferential direction of the main groove to be in the range of 60 mm to 80 mm, the length W (mm) in the tread width direction of the main groove to be in the range of 40 mm to 60 mm, and the groove depth of the main groove to be in the range of 3.7 mm to 5.0 mm.

Yet further, the length L2 (mm) and the groove depth of the auxiliary groove are preferably 10 mm to 25 mm and 2 mm to 3.5 mm, respectively.

Provided that the auxiliary groove 9 is distanced in the tread circumferential direction from the end in the specified rotation direction of the second groove 7 by a distance D, D is preferably set to be ≤20 mm.

Setting D to be ≤20 mm ensures not separating the auxiliary groove 9 too much from the main groove 8, while achieving sufficient reduction of the out-of-plane bending rigidity of the relevant tread region.

Further, a distance E in the tread width direction between the auxiliary groove 9 and the main groove 8 is preferably ≥1 mm. Setting E to be ≥1 mm reliably ensures good gripping force on a dry road surface.

The tire of the present invention, capable of enhancing braking force in straight running and generating large lateral force at a cornering situation, is suitably used for a front tire as a steering wheel of a motorcycle. However, the tire is also effectively applicable to a rear tire of a motorcycle subjected to frequent braking, such as a touring motorcycle.

EXAMPLES

Figure 4:
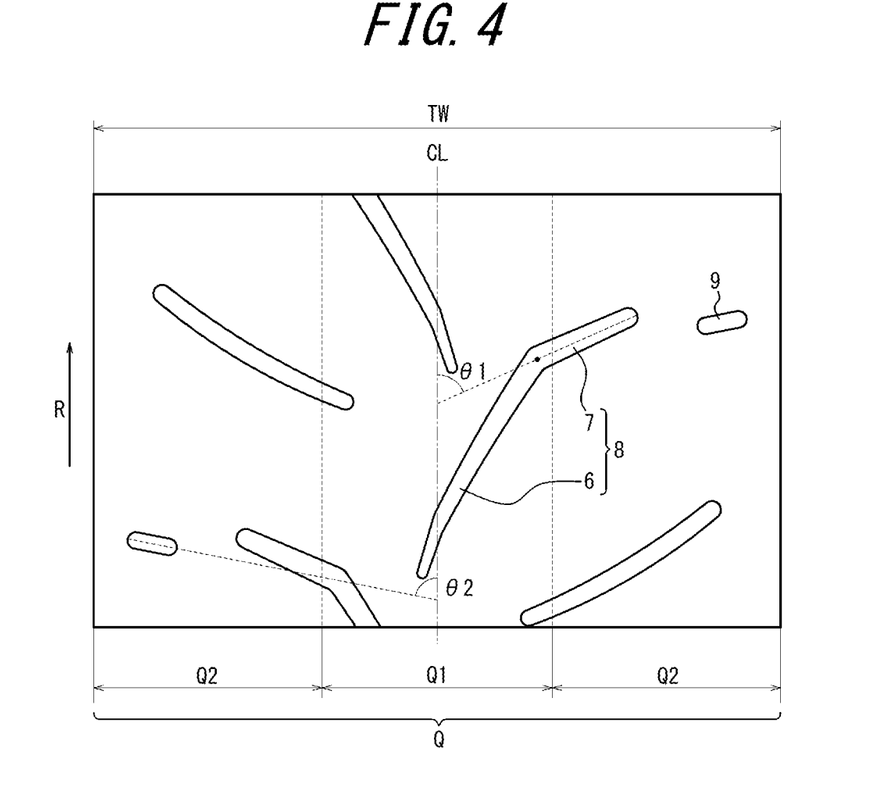
FIG. 4 is a developed view of a tread of a pneumatic tire for a motorcycle used in Examples according to the present invention.

Next, test running was carried by a driver on a dry road surface and a wet road surface, respectively, in order to confirm difference in gripping performance and drainage properties between the tire of the present invention and the conventional tires. Front tires each having tire size: MCR120/70ZR17M/C and a tread type as shown in FIG. 4 were prepared as test tires of Examples 1 to 3 and Comparative Examples 1 to 3.

Further, a front tire having tire size: MCR120/70ZR17M/C and a tread type as shown in FIG. 1 was prepared as a test tire of Conventional Example 1. General-purpose tires each having tire size: MCR190/50ZR17M/C were unanimously used as rear tires for Examples, Comp. Examples and Conventional Example.

Each of the test tires of Examples 1 to 3 and Comparative Examples 1 to 3 had a tire structure as shown in FIG. 2 and used a monospiral belt made of steel and a carcass constituted of two-layered carcass plies made of rayon. The relevant characteristics of each of the test tires are shown in Table 1.

TABLE 1

|  | Presence/absence of main groove | Presence/absence of auxiliary groove | Groove width A (mm) | Groove width B (mm) | Groove width C (mm) | Relationship between A, B and C | θ1 (°) | θ2 (°) |
|---|---|---|---|---|---|---|---|---|
| Example 1 | Present | Present | 6.5 | 4.5 | 4.2 | A > B > C | 64 | 64 |
| Example 2 | Present | Present | 6.5 | 4.5 | 4.2 | A > B > C | 65 | 71 |
| Example 3 | Present | Present | 6.5 | 4.5 | 4.2 | A > B > C | 65 | 71 |
| Comp. Ex. 1 | Present | Present | 6 | 6.5 | 7 | C > B > A | 64 | 64 |
| Comp. Ex. 2 | Present | Present | 6 | 6.5 | 7 | C > B > A | 57 | 64 |
| Comp. Ex. 3 | Present | Present | 6 | 6.5 | 5 | B > A > C | 64 | 64 |
| Conventional Example | Absent | Absent | — | — | — | — | — | — |

The test tires of each type were assembled with rims (rim size: MT3.50×17), inflated at internal pressure of 250 kPa, mounted on front and rear wheels of a 1000 cc motorcycle, and subjected to tests for evaluating gripping performance and wet performance thereof.

<Gripping Performance>

Gripping performance of each test tire was evaluated by: carrying out test running of a motorcycle by a rider on a dry road surface and a wet road surface, respectively; making the rider grade how he/she felt by sensory evaluation; and expressing each score as an index value relative to "100" as the absolute level of "moderately satisfactory".

The larger index value represents the better gripping performance.

<Wear Resistance> Wear resistance of the test tire was then evaluated by: measuring an amount of wear of the tire, based on the remaining depth of a groove in the ground contact region in straight running, after the test running; and expressing the amounts of wear thus measured as an index value relative to "100" as the wear amount of the tire of Conventional Example.

The larger index value represents the higher wear resistance.

The test results are shown in Table 2 below.

TABLE 2

|  | Gripping performance on dry road surface | Gripping performance on wet road surface | Wear resistance |
|---|---|---|---|
| Example 1 | 100 | 100 | 120 |
| Example 2 | 120 | 120 | 140 |
| Example 3 | 100 | 120 | 100 |
| Comp. Ex. 1 | 70 | 100 | 80 |
| Comp. Ex. 2 | 80 | 120 | 90 |
| Comp. Ex. 3 | 80 | 70 | 100 |
| Conventional Example | 80 | 80 | 100 | it is understood from able 2 that the tires of Examples 1 to 3 according to the present invention unanimously exhibit, at the absolute level, at least "moderately satisfactory" gripping performances on a dry road surface and a wet road surface, respectively, as well as better wear resistance than the tire of Conventional Example.

Further, it is understood from Table 2 that the tire of Example 2 having optimized inclination angles exhibits better gripping performance on a dry road surface and better wear resistance than the tire of Example 1.

INDUSTRIAL APPLICABILITY

According to the present invention, it is possible to manufacture, for shipment to the market, a pneumatic tire for a motorcycle, capable of achieving good gripping performance on a dry road surface and good gripping performance on a wet road surface in a compatible manner and exhibiting improved wear resistance.

REFERENCE SIGNS LIST

1 Bead portion
1a Bead core
2 Sidewall portion
3 Tread
4 Carcass
5 Belt
6 First groove
7 Second groove
8 Main groove
8a, 8b Bending points
9 Auxiliary groove
91 Slant groove
92 Slant groove

The invention claimed is:

1. A pneumatic tire for a motorcycle, having a pair of bead portions, a pair of sidewall portions continuous with the bead portions, a tread provided to extend in a toroidal shape across the pair of sidewall portions, and a directional pattern provided at the tread specifying a rotation direction when the tire is mounted on a vehicle; comprising:

a main groove in a bent shape, constituted of a first groove extending in a tread circumferential direction within a ground contact region in straight running, of a ground contact surface of the tread, and a second groove extending from an end portion, on the side of the rotation direction specified by the directional pattern, of the first groove toward the outer side in a tread width direction with slantly approaching the specified rotation direction; and an auxiliary groove formed at a position on the outer side in the tread width direction of the second groove and distanced in the tread circumferential direction from an end portion, on the side of the rotation direction specified by the directional pattern, of the second groove such that the auxiliary groove extends toward the outer side in the tread width direction with slantly approaching the specified rotation direction, wherein, provided that a groove width of the main groove at a connection portion of the first groove and the second groove is A (mm), a groove width of the second groove at an end on the outer side in the tread width direction is B (mm), and a groove width of the auxiliary groove is C (mm), $A > B \geq C$, wherein, provided that a distance in the tread width direction between the tire equatorial plane and a bending point on the outer side in the tread width direction of two bending points connecting the first groove and the second groove in the bent shape is d (mm); and a tread width is TW (mm), $0.25 \leq d/TW \leq 0.45$.

2. The pneumatic tire for a motorcycle of claim 1, wherein, provided that an inclination angle of the second groove with respect to the tread circumferential direction is $\theta 1$ and an inclination angle of the auxiliary groove with respect to the tread circumferential direction is $\theta 2$, $\theta 21$ $\theta 2$.

* * * * *